(12) United States Patent
Josiam et al.

(10) Patent No.: US 8,340,211 B2
(45) Date of Patent: Dec. 25, 2012

(54) METHODS AND APPARATUS TO ENCODE BANDWIDTH REQUEST MESSAGE

(75) Inventors: Kaushik Josiam, Dallas, TX (US); Zhouyue Pi, Richardson, TX (US); Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 12/816,283

(22) Filed: Jun. 15, 2010

(65) Prior Publication Data

US 2010/0322342 A1 Dec. 23, 2010

Related U.S. Application Data

(60) Provisional application No. 61/269,285, filed on Jun. 23, 2009.

(51) Int. Cl.
*H04L 27/00* (2006.01)

(52) U.S. Cl. ........ 375/295; 375/219; 375/220; 375/222; 375/260; 375/269; 375/279; 375/302; 455/39; 455/73; 455/91; 455/108; 370/272; 370/273; 370/276; 370/297; 370/344; 370/480; 341/173; 341/180

(58) Field of Classification Search .................. 375/219, 375/220, 222, 260, 269, 279, 295, 302; 455/39, 455/73, 91, 108; 370/272, 273, 276, 297, 370/344, 480; 341/173, 180
See application file for complete search history.

(56) References Cited

U.S. PATENT DOCUMENTS

| | | | |
|---|---|---|---|
| 2007/0253496 A1* | 11/2007 | Giannakis et al. | 375/260 |
| 2008/0126908 A1* | 5/2008 | Lin | 714/758 |
| 2008/0159436 A1 | 7/2008 | Cho et al. | |
| 2009/0092148 A1 | 4/2009 | Zhang et al. | |
| 2009/0141690 A1* | 6/2009 | Fan et al. | 370/335 |

FOREIGN PATENT DOCUMENTS

WO    WO 2008/049136 A1    4/2008

OTHER PUBLICATIONS

International Search Report dated Feb. 23, 2011 in connection with International Patent Application No. PCT/KR2010/004072.
Written Opinion of the International Searching Authority dated Feb. 23, 2011 in connection with International Patent Application No. PCT/KR2010/004072.

\* cited by examiner

*Primary Examiner* — Leon Flores

(57) ABSTRACT

A subscriber station is capable of encoding a bandwidth request message. The subscriber station includes a controller and a transmitter coupled to the controller. The transmitter includes a linear channel encoder and a Quadrature Phase Shift Keying (QPSK) modulation block. The channel encoder uses a generator matrix comprising alphabets from Galois field (GF) (2). Each column of the generator matrix belongs to a twelve dimensional subspace and wherein the code generated using the generator matrix has a minimum hamming distance no greater than thirty.

21 Claims, 6 Drawing Sheets

TIME →

| $Pr_{n,0}$ | $Pr_{n,4}$ | $Pr_{n,8}$ | $Pr_{n,12}$ | $Pr_{n,16}$ | $Pr_{n,20}$ |
|---|---|---|---|---|---|
| $Pr_{n,1}$ | $Pr_{n,5}$ | $Pr_{n,9}$ | $Pr_{n,13}$ | $Pr_{n,17}$ | $Pr_{n,21}$ |
| $M_{n,0}$ | $M_{n,6}$ | $M_{n,12}$ | $M_{n,18}$ | $M_{n,24}$ | $M_{n,30}$ |
| $M_{n,1}$ | $M_{n,7}$ | $M_{n,13}$ | $M_{n,19}$ | $M_{n,25}$ | $M_{n,31}$ |
| $Pr_{n,2}$ | $Pr_{n,6}$ | $Pr_{n,10}$ | $Pr_{n,14}$ | $Pr_{n,18}$ | $Pr_{n,22}$ |
| $Pr_{n,3}$ | $Pr_{n,7}$ | $Pr_{n,11}$ | $Pr_{n,15}$ | $Pr_{n,19}$ | $Pr_{n,23}$ |

| $Pr_{n,24}$ | $Pr_{n,28}$ | $Pr_{n,32}$ | $Pr_{n,36}$ | $Pr_{n,40}$ | $Pr_{n,44}$ |
|---|---|---|---|---|---|
| $Pr_{n,25}$ | $Pr_{n,29}$ | $Pr_{n,33}$ | $Pr_{n,37}$ | $Pr_{n,41}$ | $Pr_{n,45}$ |
| $M_{n,2}$ | $M_{n,8}$ | $M_{n,14}$ | $M_{n,20}$ | $M_{n,26}$ | $M_{n,32}$ |
| $M_{n,3}$ | $M_{n,9}$ | $M_{n,15}$ | $M_{n,21}$ | $M_{n,27}$ | $M_{n,33}$ |
| $Pr_{n,26}$ | $Pr_{n,30}$ | $Pr_{n,34}$ | $Pr_{n,38}$ | $Pr_{n,42}$ | $Pr_{n,46}$ |
| $Pr_{n,27}$ | $Pr_{n,31}$ | $Pr_{n,35}$ | $Pr_{n,39}$ | $Pr_{n,43}$ | $Pr_{n,47}$ |

| $Pr_{n,48}$ | $Pr_{n,52}$ | $Pr_{n,56}$ | $Pr_{n,60}$ | $Pr_{n,64}$ | $Pr_{n,68}$ |
|---|---|---|---|---|---|
| $Pr_{n,49}$ | $Pr_{n,53}$ | $Pr_{n,57}$ | $Pr_{n,61}$ | $Pr_{n,65}$ | $Pr_{n,69}$ |
| $M_{n,4}$ | $M_{n,10}$ | $M_{n,16}$ | $M_{n,22}$ | $M_{n,28}$ | $M_{n,34}$ |
| $M_{n,5}$ | $M_{n,11}$ | $M_{n,17}$ | $M_{n,23}$ | $M_{n,29}$ | $M_{n,35}$ |
| $Pr_{n,50}$ | $Pr_{n,54}$ | $Pr_{n,58}$ | $Pr_{n,62}$ | $Pr_{n,66}$ | $Pr_{n,70}$ |
| $Pr_{n,51}$ | $Pr_{n,55}$ | $Pr_{n,59}$ | $Pr_{n,63}$ | $Pr_{n,67}$ | $Pr_{n,71}$ |

FREQUENCY ↓

FIG. 8

METHODS AND APPARATUS TO ENCODE BANDWIDTH REQUEST MESSAGE

CROSS-REFERENCE TO RELATED APPLICATION(S) AND CLAIM OF PRIORITY

The present application is related to U.S. Provisional Patent Application No. 61/269,285, filed Jun. 23, 2009, entitled "METHODS AND APPARATUS TO ENCODE BANDWIDTH REQUEST MESSAGE". Provisional Patent Application No. 61/269,285 is assigned to the assignee of the present application and is hereby incorporated by reference into the present application as if fully set forth herein. The present application hereby claims priority under 35 U.S.C. §119(e) to U.S. Provisional Patent Application No. 61/269, 285.

TECHNICAL FIELD OF THE INVENTION

The present application relates generally to wireless communications and, more specifically, to encoding a bandwidth request message from a mobile station to a base station.

BACKGROUND OF THE INVENTION

The IEEE 802.16m standard, currently under development, is an enhanced update to the existing IEEE 802.16e standard. The IEEE 802.16m standard allows MSs to transmit bandwidth requests (BRs) to indicate to the BS that the MS needs an uplink (UL) bandwidth allocation. The MS can request BW from the BS by: 1) Contention based random access based bandwidth request indicator; 2) Standalone Bandwidth request; 3) Piggybacked bandwidth request carried in an extended header in the MAC PDU; and 4) Bandwidth request using fast feedback channel.

SUMMARY OF THE INVENTION

A subscriber station capable of encoding a bandwidth request message is provided. The subscriber station includes a controller and a transmitter coupled to the controller. The transmitter includes a linear channel encoder and a Quadrature Phase Shift Keying (QPSK) modulation block. The channel encoder uses a generator matrix comprising alphabets from Galois field (GF) (2). Each column of the generator matrix belongs to a twelve dimensional subspace and wherein the code generated using the generator matrix has a minimum hamming distance no greater than thirty.

A transmitter for use in subscriber station capable of encoding a bandwidth request message is provided. The transmitter includes a linear channel encoder and a Quadrature Phase Shift Keying (QPSK) modulation block. The channel encoder uses a generator matrix comprising alphabets from Galois field (GF) (2). Each column of the generator matrix belongs to a twelve dimensional subspace and wherein the code generated using the generator matrix has a minimum hamming distance no greater than thirty.

A method for encoding a bandwidth request message is provided. The method includes encoding a plurality of bits using a generator matrix comprising alphabets from Galois field (GF) (2). Each column of the generator matrix belongs to a twelve dimensional subspace and wherein the code generated using the generator matrix has a minimum hamming distance no greater than thirty. The method also includes modulating the encoded bits.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a resource structure for the bandwidth request according to embodiments of the present disclosure.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Figure 1:
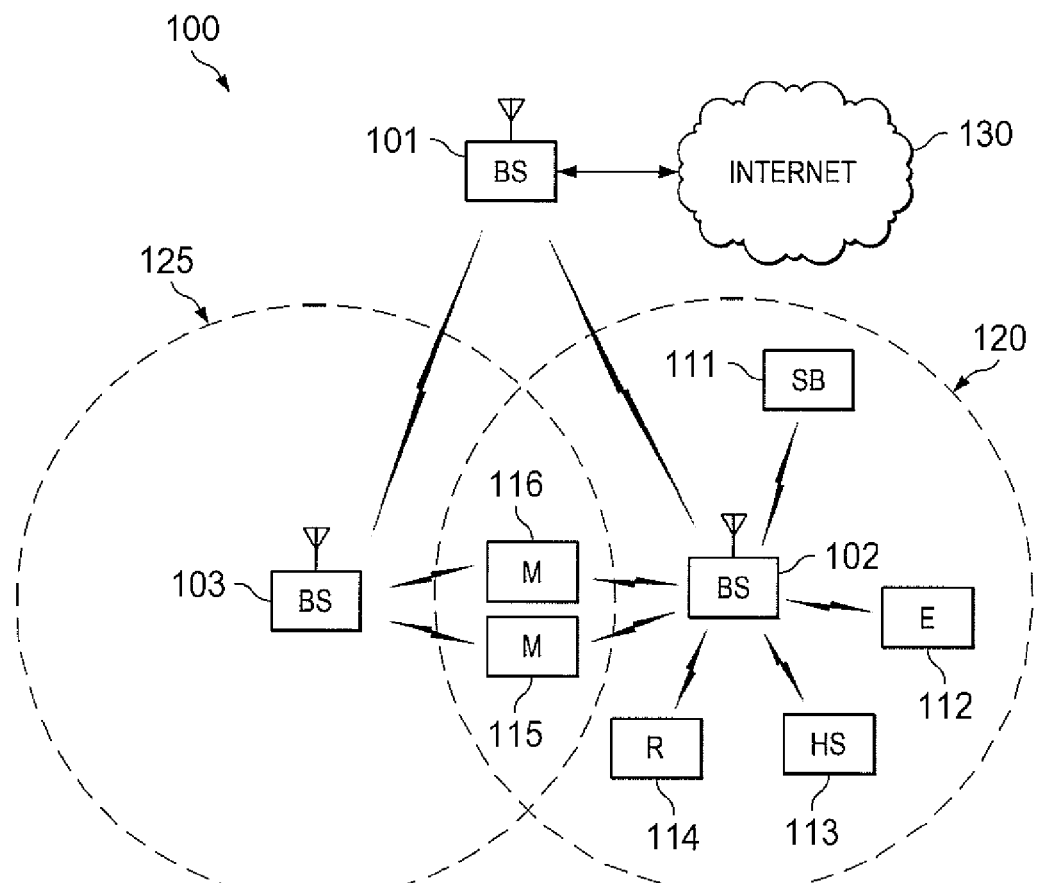
FIG. 1 illustrates an exemplary wireless network that transmits messages in the downlink according to the principles of the disclosure.

FIG. 1 illustrates an exemplary wireless network 100, which transmits messages according to the principles of the present disclosure. In the illustrated embodiment, wireless network 100 includes a base station (BS) 101, a base station (BS) 102, a base station (BS) 103, and other similar base stations (not shown). Base station 101 is in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
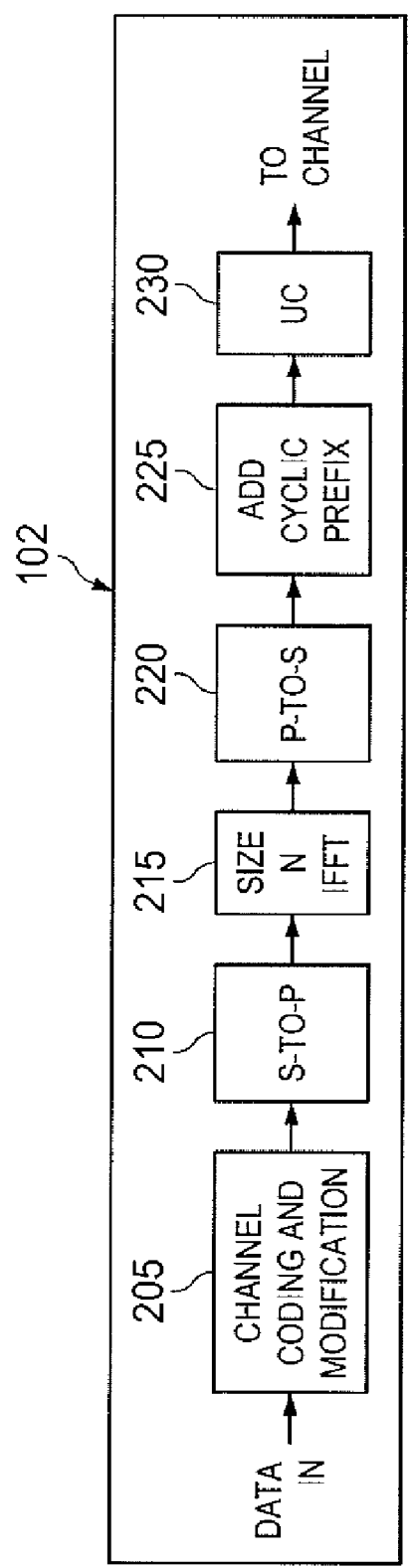
FIG. 2 is a high-level diagram of an OFDMA transmitter according to embodiments of the present disclosure.
Figure 3:
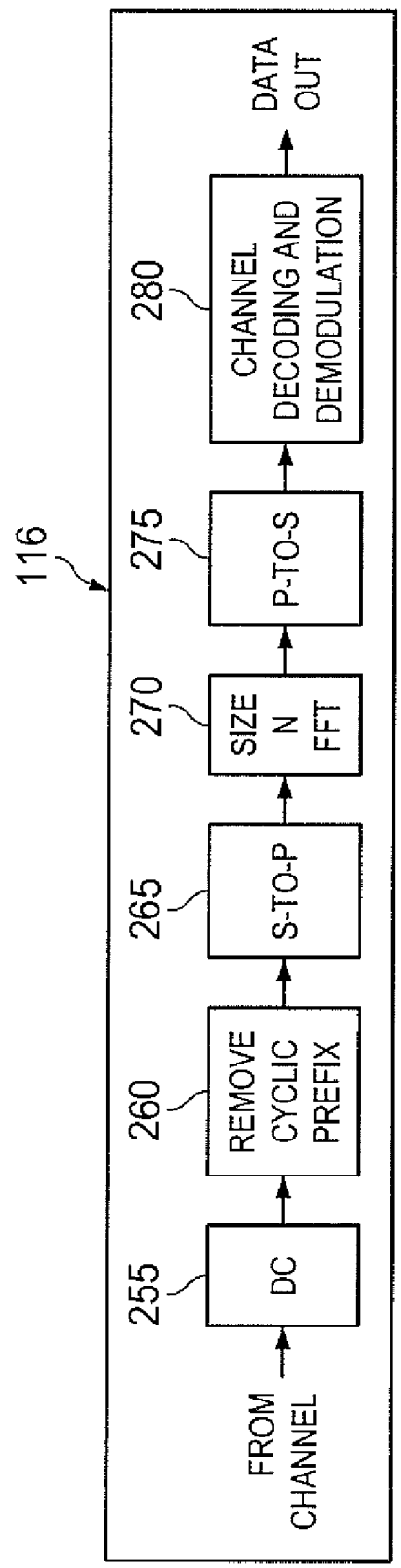
FIG. 3 is a high-level diagram of an OFDMA receiver according to embodiments of the present disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 4:
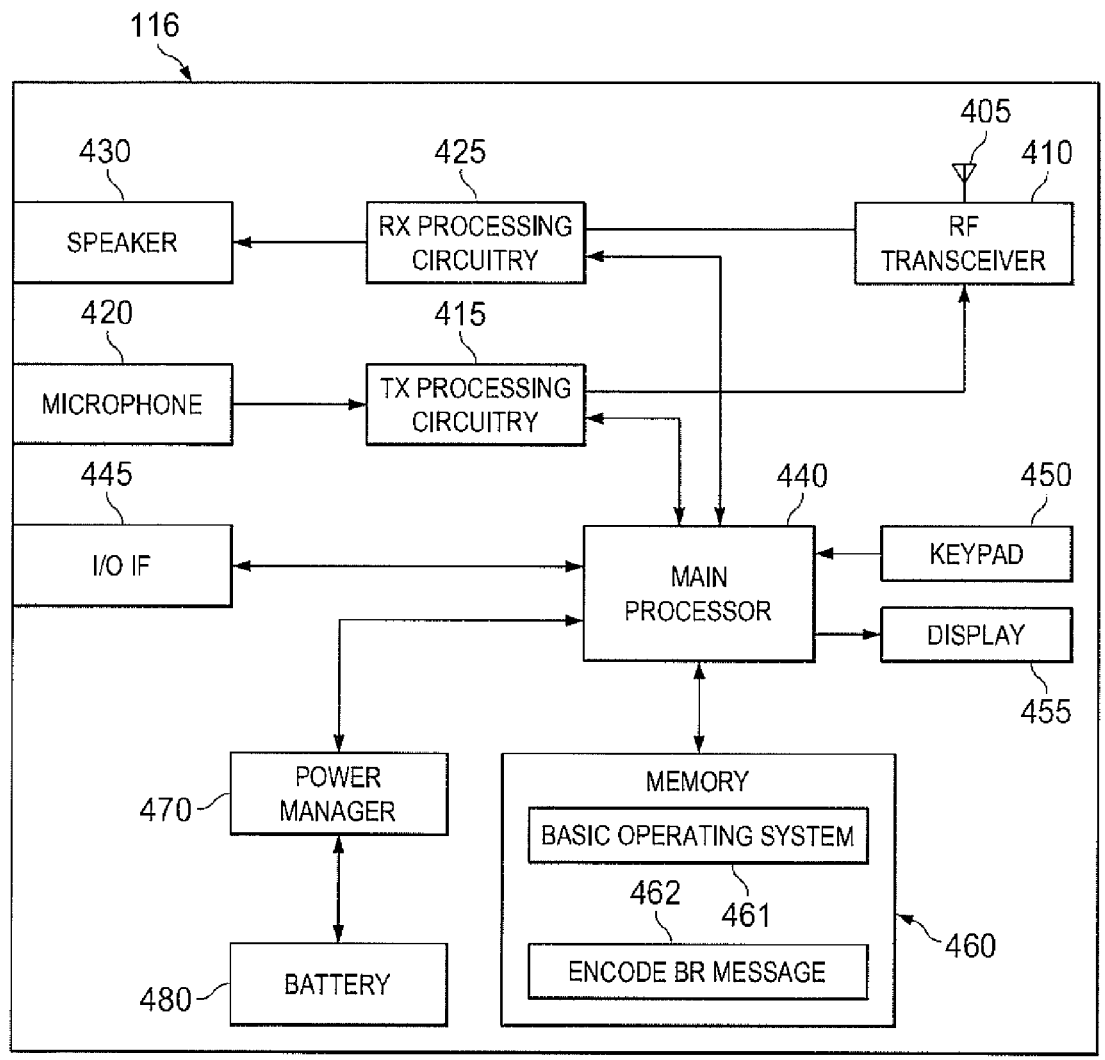
FIG. 4 illustrates a wireless subscriber station according to embodiments of the present disclosure.

FIG. 4 illustrates an example wireless subscriber station 116 according to the present disclosure. FIG. 4 illustrates wireless subscriber station 116 according to embodiments of the present disclosure. The embodiment of wireless subscriber station 116 illustrated in FIG. 4 is for illustration only.

Other embodiments of the wireless subscriber station 116 could be used without departing from the scope of this disclosure. It will be understood that although SS 116 is described for illustration and example only, descriptions can apply to SS 111-115 equally.

Wireless subscriber station 116 includes antenna 405, radio frequency (RF) transceiver 410, transmit (TX) processing circuitry 415, microphone 420, and receive (RX) processing circuitry 425. Subscriber station 116 also includes a speaker 430, main processor 440, input/output (I/O) interface (IF) 445, keypad 450, display 455, memory 460, power manager 470, and battery 480. Memory 460 further includes basic operating system (OS) program 461.

Main processor 440 executes basic operating system (OS) program 461 stored in memory 460 in order to control the overall operation of subscriber station 116. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460, such as executing a plurality of instructions for encoding a bandwidth request message 462. Main processor 440 can move data into or out of memory 460, as required by an executing process. Main processor 440 is also coupled to I/O interface 445. The operator of mobile station 400 uses keypad 450 to enter data into mobile station 400. Alternate embodiments may use other types of displays.

The present disclosure includes a method and system that focuses on the contention based random access based bandwidth request indicator. Two procedures for requesting bandwidth using a contention based random access based bandwidth request indicator are now described. The two procedures, which may be supported concurrently, include a five-step procedure and three-step quick access procedure. The five-step procedure may be used independently or as a fallback mode for the three-step quick access procedure in case of a failure in decoding the quick access (QA) message.

Figure 5:
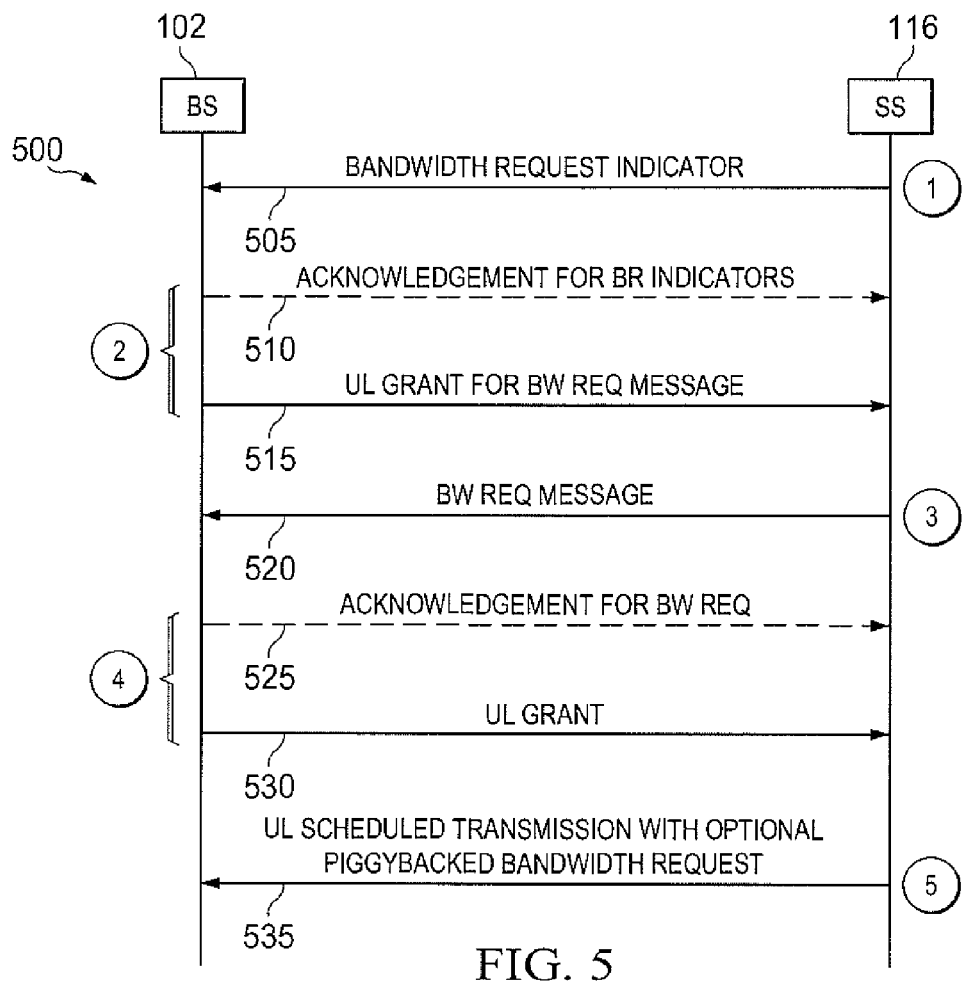
FIG. 5 illustrates a five-step random access based bandwidth request procedure in IEEE 802.16m according to embodiments of the present disclosure.

FIG. 5 illustrates a five-step random access based bandwidth request procedure in IEEE 802.16m. The five-step procedure 500 is described with respect to subscriber station 116 and base station 102. It is understood, however, that five-step procedure 500 may be used with any similarly-configured wireless device and base station.

SS 116 sends a bandwidth request indicator 505, which is a preamble sequence selected randomly from the set of preamble sequences, to BS 102 in the resource allocated for a bandwidth request channel (step 1). A preamble sequence is a sequence of numbers that belongs to a class of sequences that have desirable properties like orthogonality or low correlation. In the case of IEEE 802.16m, the preamble sequences are all orthogonal. SS 116 sends the bandwidth request indicator 505 and a message for quick access that indicates SS addressing and/or request size and type.

BS 102 transmits an acknowledgement 510 to the bandwidth request indicator (step 2). The response depends on the success or failure of the decoding. If BS 102 successfully decodes the bandwidth request indicator, BS 102 transmits a grant 515 for uplink transmission of the BW REQ header to SS 116.

If SS 116 receives the uplink grant 515 for the BW REQ header from BS 102, then SS 116 transmits a standalone bandwidth request message header 520 to base station 102 (step 3). However, if SS 116 receives no uplink grant from BS 102, then SS 116 considers the bandwidth request as failed and may restart the procedure 500.

BS 102 transmits an acknowledgement 525 for the standalone bandwidth request message 520. Upon a successful decoding of the BW REQ header, BS 102 transmits an uplink grant 530 to SS 116 (step 4). However, if the decoding fails, BS 102 sends a negative acknowledgement.

When the uplink grant 530 has been transmitted by BS 102, SS 116 transmits in the allocated resource indicated in the uplink grant (step 5). That is, SS 116 performs the UL scheduled transmission with an optional piggybacked bandwidth request 535. Alternatively, upon receiving a negative acknowledgement, SS 116 considers the bandwidth request as failed and may restart the procedure 500.

Figure 6:
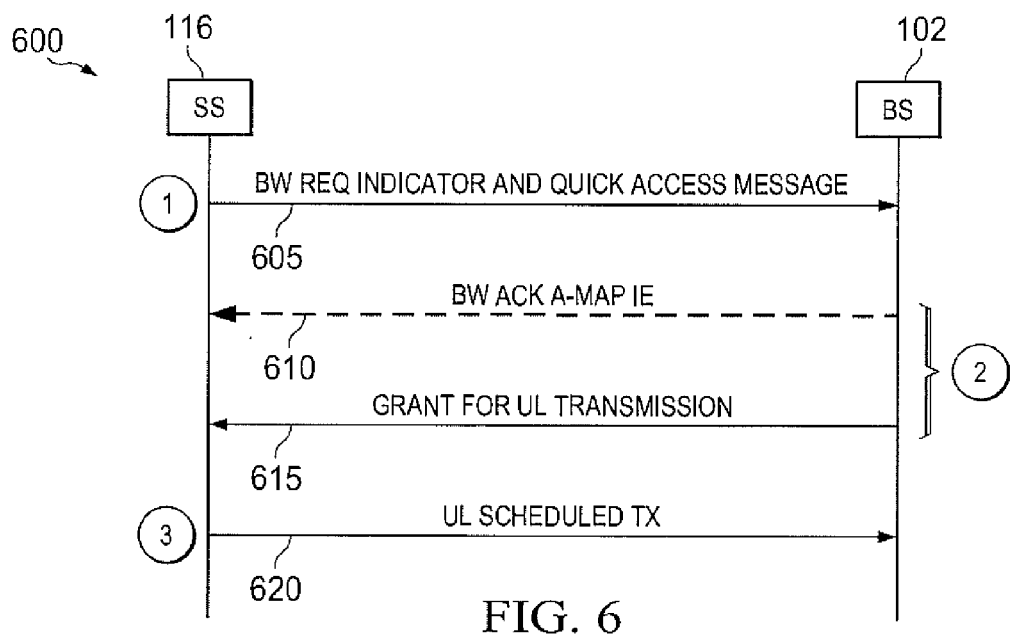
FIG. 6 illustrates a three-step bandwidth request quick access procedure for an IEEE 802.16m-compliant mobile station according to embodiments of the present disclosure.

FIG. 6 illustrates a three-step random access based bandwidth request procedure in IEEE 802.16m. The three-step procedure 600 is described with respect to subscriber station 116 and base station 102. It is understood, however, that three-step procedure 600 may be used with any similarly-configured wireless device and base station.

In some embodiments, SS 116 is sending a time-critical BW request message. SS 116 can use the three-step procedure 600 for this message. In some embodiments, the QA message includes a code. The codes are separated into two portions such that the seed of certain codes can indicate that the QA message is a time-critical message. For example, when there are twenty-four codes the preamble sequence for the first eight codes (that is, '0' to '7') indicate that the QA message is time-critical.

SS 116 sends a bandwidth request indicator and a quick access message 605 to BS 102 in the resource allocated for a bandwidth request channel (step 1). The quick access message 605 may include information to identify SS 116 and also the type of the bandwidth request, including the size of the bandwidth requested. A portion, or all, of the quick access message is transmitted in the data portion of the BW REQ channel in addition to the preamble sequence transmitted as the BW REQ indicator. In some embodiments, the quick access message is a 16-bit message, including a 12-bit mobile station ID (STID) and a 4-bit bandwidth size/priority indicator (BWSize) (also sometimes referred to as a flow ID). Quick access messages having more or fewer bits are also possible.

BS 102 responds to the bandwidth request indicator and quick access message (step 2). The response depends on the success or failure of the decoding of both the preamble sequence and the quick access message. If BS 102 successfully decodes the bandwidth request indicator and quick access message, BS 102 transmits either an explicit acknowledgement using a BW ACK A-MAP IE 610 or a grant 615 for uplink transmission to SS 116. If BS 102 fails to decode the bandwidth request indicator or the quick access message, then BS 102 transmits the BW ACK A-MAP IE 610 indicating a negative acknowledgement for the corresponding bandwidth request opportunity.

When an uplink grant 615 has been transmitted by BS 102, SS 116 begins the UL scheduled transmission 620 of the bandwidth request message (step 3). Alternatively, if SS 116 receives a negative acknowledgement indicating a quick access message decoding failure (and an acknowledgement for bandwidth request indicator decoding), or does not receive anything at all, then SS 116 starts a bandwidth request timer, and the BWREQ procedure defaults to a standard five-step procedure 700, described in further detail herein below with respect to FIG. 7.

Figure 7:
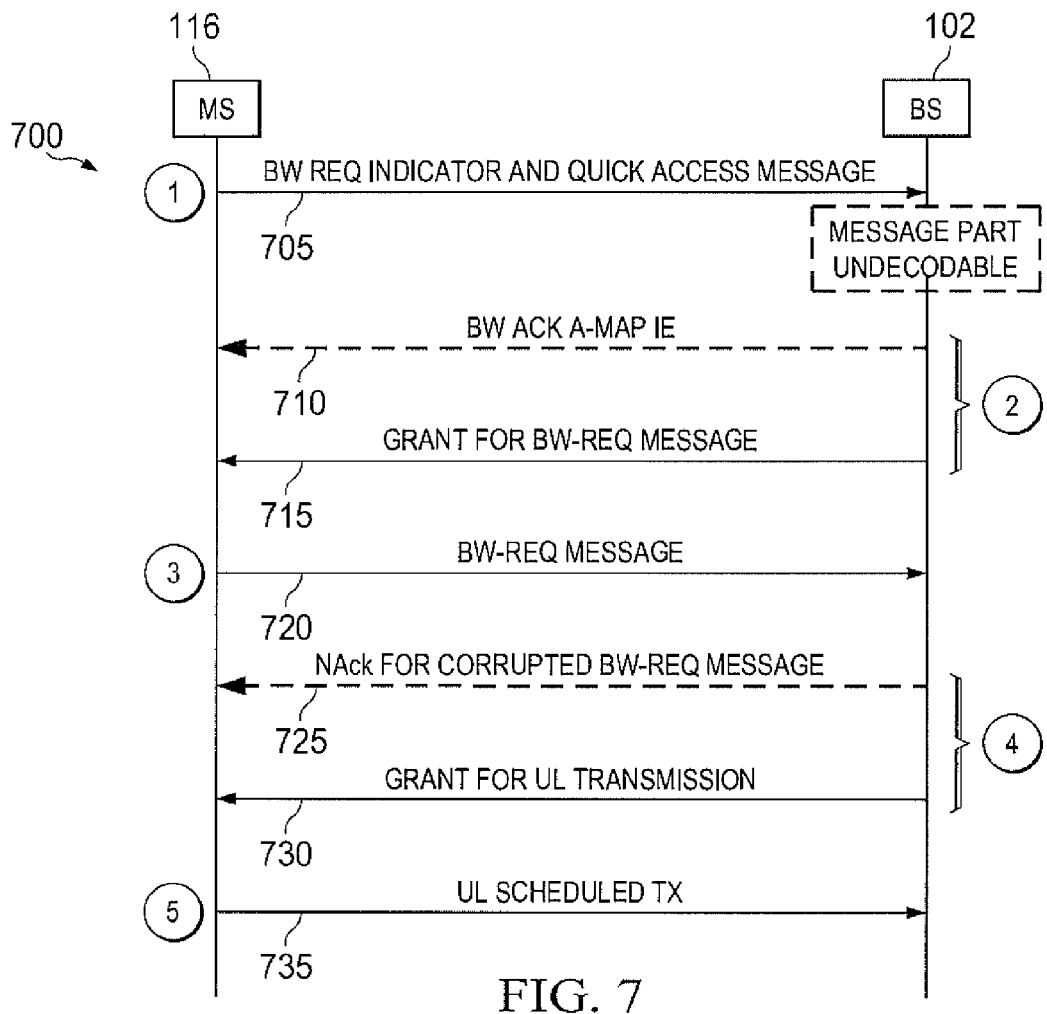
FIG. 7 illustrates a fall-back five-step random access based bandwidth request procedure in IEEE 802.16m according to embodiments of the present disclosure.

FIG. 7 illustrates a fall-back five-step random access based bandwidth request procedure in IEEE 802.16m. The fall-back five-step procedure 700 is described with respect to subscriber station 116 and base station 102. It is understood, however, that fall-back five-step procedure 700 may be used with any similarly-configured wireless device and base station.

In FIG. 7, steps 1 and 2 (that is, messages 705-715) correspond to steps 1 and 2 (that is, messages 605-615) in FIG. 6. In step 3, SS 116 transmits a standalone bandwidth request message 620 header to BS 102.

If SS 116 receives an uplink grant 630 using the default five-step procedure 700, then SS 116 stops the timer. Alternatively, if SS 116 receives a negative ACK 625 or the bandwidth request timer expires, then SS 116 considers the bandwidth request as failed and may restart the procedure (step 4).

When the uplink grant 630 has been transmitted by BS 102, SS 116 performs the UL scheduled transmission 635 in the allocated resource indicated in the uplink grant 630 (step 5).

The five-step bandwidth request procedure 700 shown in FIG. 7 is a fallback mode for the three-step bandwidth request procedure 600 shown in FIG. 6. As illustrated in FIG. 7 in step 2, BS 102, using the CDMA ALLOCATION A-MAP IE, grants SS 116 an allocation to transmit a standalone bandwidth request header.

The three-step bandwidth request procedure 600 may be limited to only certain time-critical and frequently used messages. Examples of such time-critical and frequently used messages are:

VoIP(AMR) full rate packet;
VoIP(AMR) SID;
MAC HO-REQ message;
MAC signaling header (bandwidth request header);
RoHC header; and
TCP ACK.

The messages listed above are not exhaustive but are exemplary of the type of messages that can use the three-step bandwidth request procedure 600. One common feature of the messages listed above is a computable message size. Thus, if the type of message for which bandwidth is being requested is known, the amount of bandwidth that must be granted for the mobile station to transmit that message is also known.

In the examples illustrated in FIGS. 5 through 7, steps 1, 4 and 5 are common to both five-step and three-step quick access procedures, while steps 2 and 3 are used only in 5 step regular procedure. The five-step procedure 500, 700 is used independently or as a fallback mode for the three-step bandwidth request quick access procedure 600 in case of quick access message decoding failure.

FIG. 8 illustrates a resource structure for the bandwidth request according to embodiments of the present disclosure. The embodiment of the resource structure shown in FIG. 8 is for illustration only. Other embodiments could be used without departing from the scope of this disclosure.

The physical layer OFDMA resource is designed to support both the 3-step and 5-step procedure. The basic concept of OFDMA and the concept of a physical layer resource unit configuration in IEEE 802.16m are described in IEEE C802.16m-09/0010r2, IEEE 802.16 Amendment Working Document, Editor: Ron Murias, June 2009; and IEEE C802.16m-08/0003r9a, IEEE 802.16m System Description Document, Editor: Shkumbin Hamiti, June 2009; the contents of both are herein incorporated by reference.

In IEEE 802.16m, a BR channel is made up of three distributed BR tiles where each BR tile is defined as six contiguous subcarriers by six OFDM symbols as shown in FIG. 8. SS 116 transmits either the BR indicator only or both the BR indicator and the quick access message. The BR indicator is an access sequence or a preamble of length '24'. There are twenty-four orthogonal access sequences of length '24'. To help in systematic detection at BS 102, the access sequences are partitioned into those meant for the three-step procedure 600 and those meant to indicate the five-step procedure 500. The number of access sequences reserved to be used only for three-step procedure 600 is based on the number of message types that are supported by the three-step procedure 600. Therefore, if n sequences are reserved for three-step procedure 600, then (24-n) sequences are reserved for the five-step procedure 500. If SS 116 has a message type for which a three-step procedure 600 can be used, then SS 116 chooses one of the eight sequences meant for the specific type and transmits both the preamble sequence as BR indicator and its MSID as the quick access message. BS 102 decodes the BR indicator first and notices that it is one of the eight sequences reserved for the QA message and it proceeds to decode the 12-bit MSID in the QA message. The QA message is meant to be coherently decoded. The channel estimates for coherent detection of the QA messaged are derived by using the detected BR indicator sequence as pilot sequence. The example shown in FIG. 8 detailing the placement of BR indicator and QA message is to facilitate such channel estimation and coherent decoding.

Figure 9:
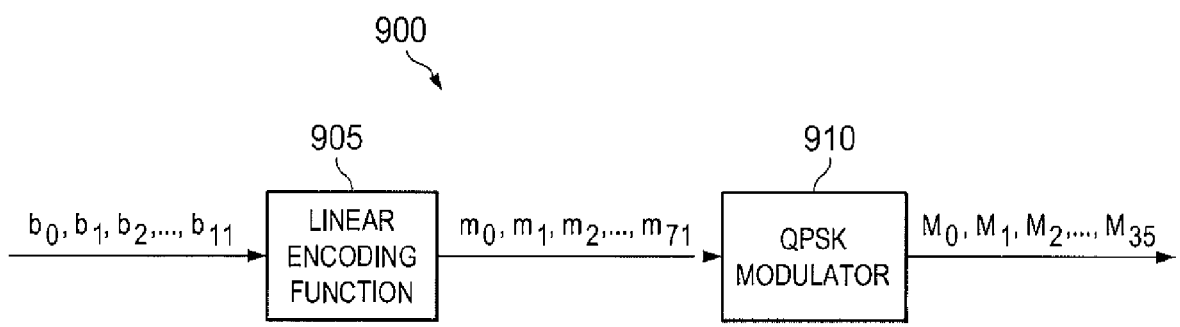
FIG. 9 illustrates a transmit processing chain for the BWREQ quick access message according to embodiments of the present disclosure.

FIG. 9 illustrates a transmit processing chain for the BWREQ quick access message according to embodiments of the present disclosure. The embodiment of the transmit processing chain 900 shown in FIG. 9 is for illustration only. Other embodiments could be used without departing from the scope of this disclosure.

The transmit processing chain 900 includes a channel encoder 905 and a Quadrature Phase Shift Keying (QPSK) modulation block 910. According to IEEE 802.16m, the channel encoder 905 followed by the QPSK modulation block 915 is used in the thirty-six tones allocated to carry the QA message. Thirty-six tones used with QPSK modulation is seventy-two bits. The message in the QA message is a twelve bit (12-bit) MS identifier (MSID). The 12-bit MSID uniquely identifies SS 116 among all subscriber stations connected to BS 102.

BS 102 maintains a roster of subscriber stations that are currently in the active state. Only those subscriber stations maintaining active connections with BS 102 can request bandwidth using the QA message. The pool of subscriber stations capable of sending a QA message is further shrunk by limiting the three-step procedure 600 for BR of certain time critical and frequently used messages.

Therefore, the 12-bit MSID is encoded to seventy-two bits with a coding rate of '⅙.' The encoding function can be a convolutional code or a linear block code. An example convolutional code is ⅙ tail biting convolutional code proposed in IEEE C802.16m-08/0878r2, Proposed Text for the Draft P802.16m Amendment on the PHY Structure for BWREQ channel, Yuan Zhu, Xiangying Yang, Qinghua Li, Changlong Xu, Jong-kae Fwu, Hujun Yin, May 2009, the contents of which are hereby incorporated by reference. In embodiments of the present disclosure provide additional and alternative coding schemes for the quick access message.

In some embodiments, the channel encoder 905 uses a linear block code generator matrix. The generator matrix is a 2-dimensional (2-D) array of zeros and ones that takes the 12-dimensional MSID and projects it into a 72-dimensional space. For example, the vector $b=\{b_0, b_1, \ldots, b_{11}\}$ can be the 12-bit MSID. Then, the 72-bit output message $m=\{m_0, m_1, \ldots, m_{71}\}$ is derived by multiplying MSID vector $\bar{b}$ with the 12×72 Generator matrix G as defined by Equations 1 and 2:

$$\underline{m} = \underline{b}G \qquad \text{[Eqn. 1]}$$

$$[m_0 m_1 \ldots m_{71}] = [b_0 b_1 \ldots b_{11}] \begin{bmatrix} G_{0,1} & \cdots & G_{0,72} \\ \vdots & \ddots & \vdots \\ G_{11,1} & \cdots & G_{11,72} \end{bmatrix} \qquad \text{[Eqn. 2]}$$

The matrix G has the following properties:
1) The matrix G is made up of alphabets from Galois field (GF) (2). Its entries can be either '0' or '1'.
2) Each column of G belongs to a 12-dimensional subspace.
3) The hamming weight distribution of $\underline{m}$ generated using the operation above is defined by the hamming weight distribution polynomial illustrated in Equation 3:

$$1+161x^{30}+616x^{31}+773x^{32}+320x^{33}+320x^{38}+880x^{39}+ \\ 752x^{40}+192x^{41}+30x^{46}+40x^{47}+10x^{48}+x^{62} \qquad \text{[Eqn. 3]}$$

4) The minimum hamming distance of the codewords is '30' and it can correct up to fourteen errors in the message m.

As shown by the hamming weight distribution polynomial in Equation 3, there are one-hundred-sixty-one codewords at a distance of thirty, six-hundred-sixteen codewords and a distance of thirty-one, and so forth.

The generator matrix G belongs to a family of codes called the linear block and is notated as a (72, 12, 30) code. Any G that has the above properties belongs to the (72, 12, 30) code family. An example of the generator matrix that is a (72, 12, 30) code is as shown in Equation 4:

$$G = \begin{bmatrix} 000001111000000111100001111110001100001111110000000010000001111000011000 \\ 000110011000110111000000111100101011100011100001111110011110011001011110 \\ 000111111011001001100101011100110011000000100110000010100010000110000010 \\ 000000001000110111101001010110101010100101011000011001100011100011001110 \\ 001010010001111011111110101011110100100011000110101100001101101111101010 \\ 011001110110010010101011011000000010110001101001001110011001110000000100 \\ 001110101011001100001010001111110000010100000011111100110010110000011000 \\ 011001111110011110011011100010100101010110001001000110111101101100110 \\ 111010111100110111111001111101011111110100111010101010010001011101111100 \\ 000000010100000110110001100111010101011011101001101101101111000010010000 \\ 101011000010110001001101100111011111001010110000011110000010101101111110 \\ 100011100100000011011010101101110001011111111101010111100101000100100110 \end{bmatrix} \qquad \text{[Eqn. 4]}$$

In some embodiments, the channel encoder 905 uses as (72, 12) linear block code that is constructed using three concatenated blocks of the (24, 12, 8) code. For example, the vector $\underline{b} = \{b_0, b_1, \ldots, b_{11}\}$ can be the 12-bit MSID. Then, the 72-bit output message $\underline{m} = \{m_0, m_1, \ldots, m_{71}\}$ is derived by multiplying MSID vector $\underline{b}$ with the 12×72 Generator matrix G' as defined by Equations 5 and 6:

$$\underline{m} = \underline{b}G' \qquad \text{[Eqn. 5]}$$

$$[m_0 m_1 \ldots m_{71}] = [b_0 b_1 \ldots b_{11}] \begin{bmatrix} G'_{0,1} & \cdots & G'_{0,72} \\ \vdots & \ddots & \vdots \\ G'_{11,1} & \cdots & G'_{11,72} \end{bmatrix} \qquad \text{[Eqn. 6]}$$

The generator matrix for the (72, 12) linear block code, G' is constructed as shown in Equation 7:

$$G' = [G_a G_b G_c] \qquad \text{[Eqn. 7]}$$

In Equation 7, $G_a$, $G_b$ and $G_c$ (a≠b≠c) are 12×24 generator matrices that belong to the Golay code family with the following characteristics:
1) The Golay code family is made up of alphabets from Galois field (GF) (2). Its entries can be either '0' or '1'.
2) Each column belongs to a 12-dimensional subspace.
3) The hamming weight distribution of the codewords is defined by the hamming weight distribution polynomial illustrated in Equation 8:

$$1+759x^8+2576x^{12}+759x^{16}+x^{24} \qquad \text{[Eqn. 8]}$$

4) The minimum hamming distance of the codewords is '8' and it can correct up to three errors in the message m.

As shown by Equation 8, there are seven hundred fifty nine codewords at hamming distance of eight, two thousand five hundred seventy six codewords at a hamming distance of twelve, seven hundred fifty nine codewords at hamming distance of sixteen, and one codeword at a hamming distance of twenty-four.

The different generator matrices $G_a$, $G_b$ and $G_c$, each having the same dimensions and weight distributions, are different automorphisms of the Golay code. The automorphism of a code are different matrices that give the same hamming weight distribution polynomial.

The concatenated (72, 12) code with generator matrix G' constructed using Golay components have the following characteristics:
1) G' is made up of alphabets from Galois field (GF) (2). Its entries can be either '0' or '1'.
2) Each column belongs to a 12-dimensional subspace.
3) The hamming weight distribution of the codewords takes the form of the polynomial (that is the hamming weight distribution polynomial) illustrated in Equation 9:

$$1+Ax^{24}+Bx^{28}+\ldots \qquad \text{[Eqn. 9]}$$

In Equation 9, the coefficients A, B, depend upon the components that make up the generator matrix G'.

4) The minimum hamming distance of the codewords is '24' and it can correct up to twelve errors in the message $\underline{m}$.

In one embodiment, any (24n, 12) linear block code, where n=1, 2, . . . is a natural number, can be constructed using different autormorphisms of the Golay code. The Generator matrix for the (24n, 12) code will be of the form illustrate in Equation 10:

$$G^n = [G_{a_1} G_{a_2} \ldots G_{a_n}] \qquad \text{[Eqn. 10]}$$

In Equation 10, $G_{a_1}$, $G_{a_2}$ and $G_{a_n}$ ($a_1 \neq a_2 \neq \ldots \neq a_n$) are 12×24 generator matrices that are different automorphisms of the Golay Code. The new generator matrix G' for (24n, 12) includes the following properties:

1) G' is made up of alphabets from Galois field (GF) (2). Its entries can be either '0' or '1'.

2) Each column belongs to a 12-dimensional subspace.

3) The hamming weight distribution of the codewords takes the form of the polynomial (that is the hamming weight distribution polynomial) illustrated in Equation 11A:

$$1+Ax^{8n}+Bx^{8n+m}+\ldots \quad \text{[Eqn. 11A]}$$

In Equation 11, n and m are natural numbers, such as '1', '2'....

4) The minimum hamming distance of the codewords is 8n and it can correct up to $$\left\lfloor \frac{8n-1}{2} \right\rfloor$$

errors in the message m.

An example of $(72, \overline{12})$ linear block code using different automorphisms of the Golay code has the following weight distribution polynomial as shown in Equation 11B:

$$A^{72}(x)=1+14x^{24}+281x^{28}+985x^{32}+1534x^{36}+994x^{40}+257x^{44}+30x^{48} \quad \text{[Eqn. 11B]}$$

In some embodiments, the channel encoder 905 uses (72, 12) linear block code that is constructed using three concatenated blocks of the (24, 12, 8) code. The generator matrix for the (72, 12) linear block code, G' is constructed as shown in Equation 12:

$$G'=[G_a G_a G_a] \quad \text{[Eqn. 12]}$$

In some embodiments, the component Golay code matrices $G_a$, $G_b$ and $G_c$ are made up of the matrices with the following properties:

1) All the Golay codewords in GF (2) map to codewords of a (6, 3, 4) Hexacode in GF(4) when the 24 codewords are rearranged in a 4×6 array. GF (4) is made up of alphabets {0, 1, ω, $\overline{\omega}$}. The (6, 3, 4) Hexacode is defined by the following generator matrix:

$$G_H = \begin{bmatrix} 1 & 0 & 0 & 1 & \overline{\omega} & \omega \\ 0 & 1 & 0 & 1 & \omega & \overline{\omega} \\ 0 & 0 & 1 & 1 & 1 & 1 \end{bmatrix} \quad \text{[Eqn. 13]}$$

2) The mapping of the Golay codewords in GF(2) to codewords of a (6, 3, 4) Hexacode can be described as discussed in Vera Pless, "Decoding the Golay Codes", IEEE Transactions on Information Theory, vol. IE-32, no. 4, July 1986, the contents of which are hereby incorporated by reference. For example, u can be a 4-tuple $(0, 1, \omega, \overline{\omega})$ over GF(4). Any column 4-tuple a=$(a_1, a_2, a_3, a_4)^t$ over GF(2) satisfying u·a=α, where α∈GF($\overline{4}$) is said to be the projection of a. Thus, by taking the projection of each of the six columns of the 4×6 array binary vectors of length '24' can be projected onto quaternary vectors of length '5.'

3) The 4×6 array of the Golay codeword with elements from GF(2) includes the following properties:

a) The parity of all columns is the same, that is, all the columns are either even or odd;

b) The parity of the columns equals the parity of the top row; and c) The projection is in the hexacode For example, the following arrays are Golay codewords that map to the (6, 3, 4) Hexacode:

$$\begin{array}{c} 0 \\ 1 \\ \omega \\ \overline{\omega} \end{array} \begin{bmatrix} 1 & 0 & 0 & 1 & 0 & 0 \\ 1 & 0 & 0 & 1 & 1 & 1 \\ 1 & 1 & 0 & 0 & 0 & 1 \\ 1 & 1 & 0 & 1 & 1 & 0 \end{bmatrix} \begin{array}{c} 0 \\ 1 \\ \cdots \omega \\ \overline{\omega} \end{array} \begin{bmatrix} 1 & 0 & 1 & 1 & 0 & 0 \\ 1 & 0 & 0 & 0 & 1 & 1 \\ 1 & 1 & 1 & 0 & 1 & 0 \\ 0 & 0 & 1 & 0 & 1 & 0 \end{bmatrix} \quad \text{[Eqn. 14]}$$

$$\quad 0 \quad 1 \quad 0 \quad 1 \quad \omega \quad \overline{\omega} \qquad \overline{\omega} \quad \omega \quad 1 \quad 0 \quad 0 \quad 1$$

Using Golay generator matrices whose codewords also map to the codewords of the (6, 3, 4) Hexacode provides that the maximum likelihood decoding algorithm implementation for decoding such a Golay code is made up of two 64-state hypothesis as opposed to just one '4096' ($2^{12}$) different hypotheses.

The component Golay (24, 12, 8) matrices $G_i$ that make up the (72, 12) linear block code includes the following tail biting structure that unfurls into a 16-state 12-section minimal tail biting trellis as discussed in A. R. Calderbank, G. David Forney, and Alexander Vardy, "Classification of certain tailbiting Generators for the Binary Golay Code" in Codes, Curves and Signals: Common threads in communication, Kluwer Academic Publishers, 1998, the contents of which hereby are incorporated by reference. This structure provides very simple decoding using a wrap around Viterbi algorithm.

$$G_t = \begin{bmatrix} * & * & * & * & * & * & * & * & * & & & \\ & * & * & * & * & * & * & * & * & * & & \\ & & * & * & * & * & * & * & * & * & * & \\ & & & * & * & * & * & * & * & * & * & * \\ & & & & * & * & * & * & * & * & * & * \\ & & & & & * & * & * & * & * & * & * \\ & & & & & & * & * & * & * & * & * \\ & & & & & & & * & * & * & * & * \\ & & & & & & & & * & * & * & * \\ * & * & & & & & & & & * & * & * \\ * & * & * & & & & & & & & * & * \\ * & * & * & * & & & & & & & & * \\ * & * & * & * & * & & & & & & & \end{bmatrix} \quad \text{[Eqn. 15]}$$

In Equation 15, * represents a '0' or a '1,' and the empty blocks indicate a '0' in 12×24 matrix. In addition, the generator matrix can be constructed according to Equation 16:

$$G_i = \{G^{(1)}, G^{(2)}, G^{(3)}, \ldots, G^{(14)}\} \quad [\text{Eqn. 16}]$$

As shown in Equation 16, $G_i$ can be based on any one of the fourteen matrices $G^{(1)}$-$G^{(14)}$. Each of the fourteen matrices $G^{(1)}$-$G^{(14)}$ is an automorphism of the Golay code. Three matrices are selected to construct the matrix G. Therefore, the generator matrix can be as shown in Equation 17:

$$G_a = G^{(i)}, \; G_b = G^{(j)}, \; G_c = G^{(k)} \quad [\text{Eqn. 17}]$$

In Equation 17, $i \neq j \neq k$. The matrix $G_a$ can take on values from a minimum of "14" to a maximum of "3×72".

An example of the component Golay code matrices $G_a$, $G_b$ and $G_c$ that generate a (72, 12) code can be represented by Equations 18, 19 and 20:

$$G_a = \begin{bmatrix} 0 & 0 & 0 & 0 & 0 & 0 & 1 & 1 & 1 & 1 & 1 & 1 & 0 & 0 & 0 & 0 & 1 & 1 & 1 & 1 & 0 & 0 & 1 & 1 \\ 0 & 1 & 1 & 1 & 1 & 1 & 0 & 0 & 0 & 0 & 1 & 1 & 0 & 0 & 1 & 1 & 0 & 1 & 0 & 1 & 0 & 1 & 0 & 0 \\ 1 & 0 & 0 & 0 & 0 & 1 & 0 & 0 & 1 & 1 & 1 & 1 & 0 & 0 & 0 & 1 & 0 & 1 & 1 & 1 & 1 & 0 & 0 & 1 \\ 0 & 0 & 0 & 0 & 1 & 1 & 0 & 1 & 1 & 1 & 1 & 1 & 0 & 1 & 1 & 0 & 1 & 1 & 0 & 0 & 0 & 0 & 1 & 0 \\ 0 & 0 & 0 & 1 & 0 & 0 & 1 & 1 & 0 & 1 & 0 & 1 & 1 & 1 & 1 & 0 & 1 & 1 & 1 & 0 & 0 & 0 & 1 & 0 \\ 0 & 0 & 1 & 1 & 0 & 1 & 0 & 0 & 1 & 0 & 1 & 0 & 1 & 0 & 1 & 0 & 1 & 1 & 1 & 1 & 0 & 1 & 0 & 0 \\ 0 & 1 & 0 & 1 & 0 & 1 & 0 & 1 & 0 & 0 & 1 & 0 & 0 & 1 & 0 & 0 & 0 & 0 & 1 & 0 & 0 & 0 & 0 & 1 \\ 1 & 0 & 1 & 1 & 0 & 1 & 1 & 1 & 0 & 0 & 0 & 1 & 0 & 1 & 1 & 0 & 0 & 1 & 1 & 0 & 0 & 0 & 0 & 1 \\ 1 & 0 & 1 & 0 & 1 & 1 & 0 & 0 & 1 & 1 & 0 & 0 & 0 & 1 & 0 & 0 & 1 & 0 & 1 & 1 & 1 & 0 & 0 & 1 \\ 0 & 1 & 1 & 1 & 1 & 0 & 1 & 0 & 1 & 1 & 0 & 0 & 1 & 0 & 0 & 1 & 0 & 1 & 1 & 0 & 0 & 0 & 0 & 1 \\ 0 & 0 & 0 & 1 & 1 & 0 & 0 & 1 & 0 & 1 & 1 & 1 & 1 & 1 & 1 & 0 & 1 & 0 & 1 & 0 & 0 & 0 & 0 & 0 \\ 1 & 1 & 0 & 0 & 1 & 0 & 0 & 0 & 1 & 1 & 0 & 1 & 1 & 1 & 0 & 0 & 0 & 1 & 1 & 0 & 1 & 0 & 0 & 1 \end{bmatrix} \quad [\text{Eqn. 18}]$$

$$G_b = \begin{bmatrix} 0 & 0 & 0 & 0 & 0 & 0 & 0 & 1 & 0 & 0 & 0 & 1 & 0 & 0 & 1 & 1 & 0 & 0 & 1 & 1 & 0 & 0 & 1 & 1 \\ 0 & 0 & 0 & 0 & 0 & 0 & 1 & 0 & 0 & 0 & 1 & 0 & 0 & 1 & 0 & 1 & 0 & 1 & 0 & 1 & 1 & 1 & 0 & 0 \\ 0 & 0 & 0 & 0 & 0 & 1 & 0 & 0 & 0 & 1 & 0 & 0 & 1 & 1 & 0 & 0 & 1 & 1 & 0 & 0 & 0 & 0 & 1 & 1 \\ 0 & 0 & 0 & 0 & 1 & 0 & 0 & 0 & 1 & 0 & 0 & 0 & 1 & 0 & 1 & 0 & 1 & 0 & 1 & 0 & 1 & 1 & 0 & 0 \\ 0 & 0 & 0 & 1 & 1 & 0 & 1 & 0 & 0 & 1 & 0 & 1 & 1 & 0 & 0 & 0 & 1 & 0 & 1 & 1 & 1 & 1 & 0 & 1 \\ 0 & 0 & 1 & 0 & 0 & 1 & 0 & 1 & 1 & 0 & 1 & 0 & 0 & 0 & 1 & 0 & 0 & 1 & 1 & 1 & 0 & 1 & 1 & 1 \\ 0 & 1 & 0 & 0 & 1 & 0 & 1 & 0 & 0 & 1 & 0 & 1 & 0 & 0 & 0 & 1 & 1 & 1 & 0 & 1 & 1 & 1 & 1 & 0 \\ 1 & 0 & 0 & 0 & 0 & 1 & 0 & 1 & 1 & 0 & 1 & 0 & 0 & 1 & 0 & 0 & 1 & 1 & 1 & 0 & 1 & 0 & 1 & 1 \\ 0 & 1 & 1 & 1 & 0 & 0 & 0 & 0 & 1 & 1 & 0 & 0 & 1 & 1 & 0 & 1 & 0 & 1 & 1 & 1 & 1 & 0 & 1 & 0 \\ 1 & 1 & 1 & 0 & 0 & 0 & 0 & 0 & 1 & 1 & 0 & 0 & 1 & 0 & 0 & 1 & 0 & 1 & 1 & 1 & 1 & 0 & 0 & 1 \\ 1 & 1 & 0 & 1 & 0 & 0 & 0 & 0 & 1 & 0 & 0 & 1 & 0 & 1 & 1 & 0 & 1 & 1 & 0 & 1 & 0 & 1 & 0 & 1 \\ 1 & 0 & 1 & 1 & 0 & 0 & 0 & 0 & 0 & 1 & 1 & 1 & 0 & 0 & 1 & 1 & 1 & 1 & 0 & 0 & 1 & 1 & 1 & 0 \end{bmatrix} \quad [\text{Eqn. 19}]$$

$$G_c = \begin{bmatrix} 0 & 0 & 0 & 0 & 0 & 1 & 1 & 1 & 0 & 0 & 0 & 1 & 1 & 1 & 1 & 0 & 0 & 0 & 0 & 1 & 1 & 0 & 1 & 1 \\ 0 & 0 & 0 & 1 & 1 & 0 & 0 & 0 & 0 & 1 & 1 & 0 & 0 & 0 & 1 & 1 & 0 & 0 & 1 & 1 & 1 & 1 & 1 & 1 \\ 0 & 0 & 1 & 0 & 1 & 0 & 0 & 1 & 1 & 0 & 1 & 0 & 1 & 1 & 0 & 1 & 0 & 1 & 1 & 1 & 1 & 0 & 0 & 0 \\ 0 & 0 & 0 & 0 & 1 & 0 & 1 & 0 & 1 & 1 & 0 & 1 & 0 & 0 & 0 & 1 & 1 & 0 & 0 & 1 & 0 & 0 & 0 & 0 \\ 0 & 1 & 1 & 1 & 0 & 1 & 0 & 0 & 0 & 0 & 0 & 1 & 0 & 1 & 0 & 0 & 0 & 1 & 0 & 1 & 0 & 0 & 0 & 0 \\ 0 & 1 & 0 & 1 & 1 & 0 & 1 & 0 & 1 & 1 & 0 & 0 & 0 & 0 & 1 & 1 & 1 & 0 & 1 & 0 & 0 & 1 & 1 & 0 \\ 0 & 0 & 0 & 0 & 0 & 0 & 1 & 1 & 0 & 0 & 0 & 0 & 1 & 0 & 1 & 0 & 0 & 1 & 0 & 1 & 0 & 1 & 1 & 0 \\ 0 & 0 & 0 & 0 & 0 & 0 & 0 & 1 & 1 & 0 & 1 & 0 & 1 & 0 & 0 & 0 & 1 & 0 & 1 & 0 & 1 & 1 & 1 & 0 \\ 0 & 0 & 1 & 1 & 1 & 1 & 0 & 0 & 1 & 0 & 1 & 1 & 0 & 0 & 0 & 1 & 1 & 1 & 1 & 1 & 0 & 0 & 0 & 0 \\ 0 & 0 & 0 & 1 & 0 & 1 & 1 & 1 & 0 & 0 & 1 & 0 & 1 & 0 & 1 & 1 & 0 & 0 & 0 & 0 & 0 & 0 & 0 & 0 \\ 0 & 0 & 0 & 0 & 0 & 0 & 0 & 1 & 1 & 1 & 1 & 1 & 1 & 1 & 1 & 1 & 1 & 1 & 1 & 0 & 0 & 0 & 0 & 0 \\ 1 & 1 & 1 & 1 & 1 & 1 & 1 & 0 & 0 & 0 & 0 & 0 & 0 & 0 & 0 & 1 & 1 & 1 & 1 & 0 & 0 & 0 & 0 & 0 \end{bmatrix} \quad [\text{Eqn. 20}]$$

An example of the generating matrices $G_a$, $G_b$ and $G_c$, whose codewords project on to the (6, 3, 4) Hexacode can be represented by Equations 21, 22 and 23:

$$G_a = \begin{bmatrix} 1 & 1 & 1 & 1 & 1 & 1 & 1 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 1 & 1 & 1 & 1 & 1 & 1 & 1 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 \\ 1 & 1 & 1 & 1 & 0 & 0 & 0 & 0 & 1 & 1 & 1 & 1 & 0 & 0 & 0 & 0 & 0 & 0 & 0 & 0 & 0 & 0 & 0 & 0 \\ 0 & 0 & 0 & 0 & 0 & 0 & 0 & 0 & 1 & 1 & 1 & 1 & 0 & 0 & 0 & 0 & 1 & 1 & 1 & 1 & 0 & 0 & 0 & 0 \\ 1 & 1 & 0 & 0 & 1 & 1 & 0 & 0 & 1 & 1 & 0 & 0 & 1 & 1 & 0 & 0 & 0 & 0 & 0 & 0 & 0 & 0 & 0 & 0 \\ 1 & 0 & 1 & 0 & 1 & 0 & 1 & 0 & 1 & 0 & 1 & 0 & 1 & 0 & 1 & 0 & 0 & 0 & 0 & 0 & 0 & 0 & 0 & 0 \\ 0 & 0 & 0 & 0 & 0 & 0 & 0 & 0 & 1 & 1 & 0 & 0 & 1 & 1 & 0 & 0 & 1 & 1 & 0 & 0 & 1 & 1 & 0 & 0 \\ 0 & 0 & 0 & 0 & 0 & 0 & 0 & 0 & 1 & 0 & 1 & 0 & 1 & 0 & 1 & 0 & 1 & 0 & 1 & 0 & 1 & 0 & 1 & 0 \\ 1 & 0 & 0 & 1 & 1 & 1 & 0 & 0 & 1 & 0 & 0 & 1 & 1 & 1 & 0 & 0 & 1 & 0 & 0 & 1 & 1 & 1 & 0 & 0 \\ 1 & 1 & 1 & 1 & 1 & 0 & 0 & 1 & 1 & 1 & 1 & 1 & 1 & 0 & 0 & 0 & 1 & 0 & 1 & 0 & 1 & 1 & 1 & 0 \\ 0 & 1 & 1 & 1 & 0 & 0 & 0 & 0 & 1 & 1 & 1 & 1 & 0 & 0 & 0 & 0 & 1 & 1 & 1 & 1 & 0 & 0 & 0 & 0 \end{bmatrix}$$ [Eqn. 21]

$$G_b = \begin{bmatrix} 1 & 1 & 1 & 1 & 0 & 0 & 0 & 0 & 1 & 1 & 1 & 1 & 0 & 0 & 0 & 0 & 0 & 0 & 0 & 0 & 0 & 0 & 0 & 0 \\ 0 & 0 & 0 & 0 & 1 & 1 & 1 & 1 & 1 & 1 & 1 & 1 & 0 & 0 & 0 & 0 & 0 & 0 & 0 & 0 & 0 & 0 & 0 & 0 \\ 1 & 1 & 0 & 0 & 1 & 0 & 0 & 1 & 1 & 0 & 1 & 0 & 0 & 0 & 0 & 0 & 0 & 0 & 0 & 0 & 1 & 0 & 1 & 0 \\ 0 & 0 & 0 & 1 & 0 & 0 & 0 & 1 & 1 & 1 & 1 & 0 & 0 & 0 & 0 & 1 & 1 & 0 & 0 & 0 & 1 & 0 & 0 & 0 \\ 1 & 0 & 0 & 1 & 0 & 0 & 0 & 0 & 0 & 0 & 0 & 1 & 0 & 0 & 1 & 1 & 0 & 1 & 0 & 1 & 1 & 0 & 0 & 0 \\ 0 & 0 & 0 & 0 & 1 & 0 & 0 & 1 & 0 & 0 & 0 & 0 & 1 & 0 & 0 & 1 & 1 & 1 & 0 & 0 & 1 & 0 & 1 & 0 \\ 0 & 0 & 0 & 0 & 0 & 0 & 0 & 0 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 0 & 0 & 0 & 0 & 0 & 0 & 1 & 1 & 0 & 0 & 0 & 1 & 1 & 0 & 1 & 0 & 0 & 1 \\ 0 & 0 & 1 & 0 & 0 & 1 & 0 & 0 & 0 & 0 & 0 & 1 & 1 & 0 & 0 & 0 & 0 & 1 & 1 & 1 & 0 & 0 & 0 & 1 \\ 0 & 1 & 1 & 0 & 0 & 1 & 1 & 0 & 0 & 1 & 1 & 0 & 0 & 1 & 1 & 0 & 0 & 0 & 0 & 0 & 0 & 0 & 0 & 0 \\ 0 & 0 & 1 & 0 & 0 & 0 & 1 & 0 & 1 & 0 & 1 & 1 & 0 & 1 & 0 & 0 & 0 & 0 & 0 & 1 & 0 & 0 & 0 & 1 \end{bmatrix}$$ [Eqn. 22]

$$G_c = \begin{bmatrix} 1 & 1 & 1 & 1 & 0 & 0 & 0 & 0 & 1 & 1 & 1 & 1 & 0 & 0 & 0 & 0 & 0 & 0 & 0 & 0 & 0 & 0 & 0 & 0 \\ 0 & 0 & 0 & 0 & 1 & 1 & 1 & 1 & 1 & 1 & 1 & 1 & 0 & 0 & 0 & 0 & 0 & 0 & 0 & 0 & 0 & 0 & 0 & 0 \\ 1 & 0 & 0 & 1 & 0 & 1 & 1 & 0 & 0 & 1 & 1 & 0 & 1 & 0 & 0 & 1 & 0 & 0 & 0 & 0 & 0 & 0 & 0 & 0 \\ 1 & 1 & 0 & 1 & 0 & 0 & 1 & 0 & 0 & 0 & 0 & 1 & 0 & 0 & 0 & 1 & 0 & 1 & 0 & 0 & 0 & 1 & 0 & 0 \\ 1 & 0 & 0 & 0 & 0 & 1 & 0 & 0 & 0 & 1 & 0 & 0 & 1 & 0 & 0 & 0 & 1 & 1 & 1 & 0 & 0 & 0 & 1 & 0 \\ 1 & 0 & 0 & 1 & 0 & 0 & 0 & 0 & 0 & 0 & 0 & 0 & 1 & 0 & 0 & 1 & 1 & 0 & 1 & 0 & 1 & 1 & 0 & 0 \\ 0 & 0 & 0 & 0 & 0 & 0 & 0 & 0 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 \\ 0 & 0 & 0 & 0 & 1 & 0 & 0 & 1 & 0 & 0 & 0 & 0 & 1 & 1 & 0 & 0 & 0 & 1 & 1 & 1 & 0 & 1 & 0 & 0 \\ 0 & 0 & 1 & 0 & 1 & 0 & 0 & 0 & 1 & 0 & 0 & 0 & 0 & 1 & 0 & 1 & 0 & 1 & 1 & 0 & 0 & 0 & 0 & 1 \\ 0 & 1 & 1 & 0 & 1 & 0 & 0 & 1 & 1 & 0 & 0 & 1 & 0 & 1 & 1 & 0 & 0 & 0 & 0 & 0 & 0 & 0 & 0 & 0 \\ 0 & 0 & 1 & 0 & 0 & 0 & 1 & 0 & 1 & 0 & 1 & 1 & 0 & 1 & 0 & 0 & 0 & 0 & 0 & 1 & 0 & 0 & 0 & 1 \end{bmatrix}$$ [Eqn. 23]

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A subscriber station configured for use in a wireless communication network, the subscriber station comprising:
    a controller; and
    a transmitter coupled to the controller, the transmitter comprising:
        a linear channel encoder configured to generate a bandwidth request message using a generator matrix of a linear block code comprising alphabets from a Galois field (GF) (2), wherein each column of the generator matrix of the linear block code belongs to a twelve dimensional subspace and wherein a plurality of bits generated using the generator matrix has a minimum hamming distance no greater than thirty; and
        a modulation block configured to modulate the encoded bits.

2. The subscriber station as set forth in claim 1, wherein the generator matrix comprises a (24n, 12) linear block code further includes at least three concatenated generator matrices, where n is a natural number, each component of the concatenated generator matrix is a Golay code made up of 24 columns and the code generated using the component generator matrix has a hamming distance no smaller than eight.

3. The subscriber station as set forth in claim 2, wherein the generator matrix of the (24n, 12) linear block code is constructed using 'n' Golay code generator matrices, where n is a natural number.

4. The subscriber station as set forth in claim 3, wherein the generator matrix comprises a (72, 12) linear block code is constructed based on an equation defined as:

$$G' = [G_a G_b G_d],$$

where G' is defined as the generator matrix, and Ga, Gb, and Gc are defined as the Golay code generator matrices.

5. The subscriber station as set forth in claim 2, wherein the generator matrix of the (24n, 12) linear block code is based on concatenating different automorphisms of the Golay code, where n is a natural number.

6. The subscriber station as set forth in claim 2, wherein the generator matrix comprises a (72, 12) linear block code is constructed by repeating a Generator matrix Ga of a (24, 12) Golay code based on an equation defined as:

$$G'=[G_a G_a G_a],$$

where G' is defined as the generator matrix, and Ga, Gb, and Gc are defined as the Golay code generator matrices.

7. The subscriber station as set forth in claim 2, wherein each component Golay codeword in GF(2) are configured to map to codewords of a Hexacode in GF(4) and wherein the GF(4) comprises alphabets of 0, 1, $\omega$, $\bar{\omega}$, and wherein the Hexacode is defined by:

$$G_H = \begin{bmatrix} 1 & 0 & 0 & 1 & \bar{\omega} & \omega \\ 0 & 1 & 0 & 1 & \omega & \bar{\omega} \\ 0 & 0 & 1 & 1 & 1 & 1 \end{bmatrix}.$$

8. A transmitter for use in a subscriber station configured for use in a wireless communication network, the transmitter comprising:
  a linear channel encoder configured to generate a bandwidth request message using a generator matrix of a linear block code comprising alphabets from a Galois field (GF) (2), wherein each column of the generator matrix or the linear block code belongs to a twelve dimensional subspace and wherein a plurality of bits generated using the generator matrix has a minimum hamming distance no greater than thirty; and
  a modulation block configured to modulate the encoded bits.

9. The transmitter as set forth in claim 8, wherein the generator matrix comprises a (24n, 12) linear block code further including at least three concatenated generator matrices, where n is a natural number, each component of the concatenated generator matrix is a Golay code made up of 24 columns and the code generated using the component generator matrix has a hamming distance no smaller than eight.

10. The transmitter as set forth in claim 9, wherein the generator matrix of the (24n, 12) linear block code is constructed using 'n' generator matrices of the Golay code, where n is a natural number.

11. The transmitter as set forth in claim 10, wherein the generator matrix of the (24n, 12) linear block code is constructed based on an equation defined as:

$$G'=[G_a G_b G_c],$$

where G' is defined as the generator matrix, and Ga, Gb, and Gc are defined as the Golay code generator matrices.

12. The transmitter as set forth in claim 9, wherein the generator matrix of the (24n, 12) linear block code is based on concatenating different automorphisms of the Golay code, where n is a natural number.

13. The transmitter as set forth in claim 9, wherein the generator matrix comprises a (72, 12) linear block code is constructed by repeating a Generator matrix Ga of a (24, 12) Golay code based on an equation defined as:

$$G'=[G_a G_a G_a],$$

where G' is defined as the generator matrix, and Ga, Gb, and Gc are defined as the Golay code generator matrices.

14. The transmitter as set forth in claim 9, wherein each component Golay codeword in GF(2) is configured to map to codewords of a Hexacode in GF(4) and wherein the GF(4) comprises alphabets of 0, 1, $\omega$, $\bar{\omega}$, and wherein the Hexacode is defined by:

$$G_H = \begin{bmatrix} 1 & 0 & 0 & 1 & \bar{\omega} & \omega \\ 0 & 1 & 0 & 1 & \omega & \bar{\omega} \\ 0 & 0 & 1 & 1 & 1 & 1 \end{bmatrix}.$$

15. For use in a wireless communication network, a method comprising:
  encoding a bandwidth request message comprising a mobile station identifier (MSID) using a generator matrix of a linear block code comprising alphabets from a Galois field (GF) (2), wherein each column of the generator matrix of the linear block code belongs to a twelve dimensional subspace and wherein a plurality of bits generated using the generator matrix of the linear block code has a minimum hamming distance no greater than thirty; and
  modulating the encoded bits.

16. The method as set forth in claim 15, wherein the generator matrix comprises a (24n, 12) linear block code further including at least three concatenated generator matrices, where n is a natural number, each component of the concatenated generator matrix is a Golay code made up of 24 columns and the code generated using the component generator matrix has a hamming distance no smaller than eight.

17. The method as set forth in claim 16, wherein the generator matrix of the (24n, 12) linear block code is constructed using 'n' generator matrices of the Golay code, where n is a natural number.

18. The method as set forth in claim 17, wherein the generator matrix comprises a (72, 12) linear block code is constructed based on an equation defined as:

$$G'=[G_a G_b G_c],$$

where G' is defined as the generator matrix, and Ga, Gb, and Gc are defined as the Golay code generator matrices.

19. The method as set forth in claim 17, wherein the generator matrix comprises a (72, 12) linear block code is constructed by repeating a Generator matrix Ga of a (24, 12) Golay code based on an equation defined as:

$$G'=[G_a G_a G_a],$$

where G' is defined as the generator matrix, and Ga, Gb, and Gc are defined as the Golay code generator matrices.

20. The method as set forth in claim 16, wherein the generator matrix of the (24n, 12) linear block code is based on concatenating different automorphisms of the Golay code.

21. The method as set forth in claim 16, wherein each component Golay codeword in GF(2) map to codewords of a Hexacode in GF(4) and wherein the GF(4) comprises alphabets of 0, 1, $\omega$, $\bar{\omega}$, and wherein the Hexacode is defined by:

$$G_H = \begin{bmatrix} 1 & 0 & 0 & 1 & \bar{\omega} & \omega \\ 0 & 1 & 0 & 1 & \omega & \bar{\omega} \\ 0 & 0 & 1 & 1 & 1 & 1 \end{bmatrix}.$$

* * * * *